Patented Aug. 29, 1933

1,924,166

UNITED STATES PATENT OFFICE 1,924,166

PRODUCTION OF NITRO - SULPHONIC ACIDS OF POLYHYDROXYANTHRAQUINONES

Donald G. Rogers, Hamburg, N. Y., assignor to National Aniline and Chemical Company, Inc., New York, N. Y., a Corporation of New York No Drawing. Application March 20, 1930
Serial No. 437,589

28 Claims. (Cl. 260—58).

This invention relates to the production of nitrosulphonic acids of poly-hydroxyanthraquinone compounds which contain at least one hydroxyl group in each of the benzene residues of the anthraquinone nucleus, and more particularly to improvements in the sulphonation of alpha-alpha-dihydroxyanthraquinone compounds and in the nitration of disulphonic acids of alpha - alpha - dihydroxyanthraquinone compounds. The invention relates specifically to improvements in the production of dinitro-disulphonic acids of anthrarufine (1.5-dihydroxyanthraquinone) and of chrysazine (1.8-dihydroxyanthraquinone) by the sulphonation and subsequent nitration of anthrarufine and/or chrysazine, and includes a method of isolating dinitroanthrarufine disulphonic acid from a mixture containing it and dinitro-chrysazine disulphonic acid.

Dinitro-disulphonic acids of poly-hydroxyanthraquinones which contain at least one hydroxyl group in each of the benzene residues of the anthraquinone nucleus may be prepared, according to known processes, by sulphonating the corresponding hydroxyanthraquinone to form the disulphonic acid, and subsequently nitrating the resulting disulphonic acid, either with or without isolating it from the sulphonation mass.

In carrying out the process in accordance with one well-known method of procedure, an alpha-alpha-dihydroxyanthraquinone, such as anthrarufine (1.5-dihydroxyanthraquinone) and/or chrysazine (1.8-dihydroxyanthraquinone), is heated at about 100° to 120° C. with oleum to produce the disulphonic acid; the reaction mixture is subjected to the action of nitrating acid (a mixture of nitric and sulphuric acids); and the resulting dinitro-disulphonic acid, which crystallizes out of the reaction mixture, is filtered off, dissolved in water, and salted out as the alkali-metal salt. (Cf. U.S.P. 594,349 and 594,350.)

Anthrarufine is generally obtained in practice by the disulphonation of anthraquinone in the presence of mercury as a catalyst, followed by fusion of the resulting anthraquinone disulphonic acid with lime. When prepared in this manner, a technical product is obtained which contains the anthrarufine in admixture with chrysazine and other anthraquinone compounds as impurities. As a consequence, when technical anthrarufine is converted to a dinitro-disulphonic acid compound, the product obtained contains the corresponding dinitro-chrysazine disulphonic acid compound.

It has heretofore been proposed to produce dinitroanthrarufine disulphonic acid relatively free from dinitro-chrysazine disulphonic acid by disulphonating anthraquinone, separating the resulting 1.5- and 1.8-anthraquinone-disulphonic acids in several ways, converting said 1.5-disulphonic acid to anthrarufine, and sulphonating and nitrating said anthrarufine. Thus, anthraquinone is disulphonated with oleum in the presence of mercury as a catalyst to produce a mixture of the 1.5- and 1.8-anthraquinone-disulphonic acids; and, according to one method, the relatively less soluble 1.5-anthraquinone-disulphonic acid is separated from a concentrated sulphuric acid solution of the remaining sulphonation mass, or, according to another method, the 1.5- and 1.8-anthraquinone-disulphonic acids are separated by a fractional crystallization of their salts; and the separated 1.5-anthraquinone-disulphonic acid is further treated as described. These methods, however, are attended by operating difficulties which render them expensive.

An object of the present invention is to provide improvements in a process of producing a nitro-sulphonic acid of a dihydroxyanthraquinone by the sulphonation and subsequent nitration of a dihydroxyanthraquinone which contains at least one hydroxyl group in each of the benzene residues of the anthraquinone nucleus whereby the yield and purity of the intermediate sulphonic acid compound and of the final nitrosulphonic acid compound are increased.

A further object of the invention is to provide improvements in a process of sulphonating a dihydroxyanthraquinone whereby reaction conditions can be employed which are less drastic than those formerly used.

Another object of the invention is to provide improvements in a process for the sulphonation of a dihydroxyanthraquinone which contains at least one hydroxyl group in each of the benzene residues of the anthraquinone nucleus whereby each of the three major reaction-controlling factors—time, temperature and concentration of oleum—can be decreased without concurrently increasing one or both of the other two factors.

An additional object of the invention is to provide improvements in a process for the sulphonation of a dihydroxyanthraquinone which contains at least one hydroxyl group in each of the benzene residues of the anthraquinone nucleus whereby the extent of oversulphonation, oxidation and decomposition can be decreased.

Another object of the invention is to provide an improvement in a process for the nitration of a dihydroxy-anthraquinone sulphonic acid whereby the extent of decomposition and oxidation can be reduced.

Still another object of the invention is to provide a process for the isolation of dinitro-anthrarufine disulphonic acid relatively free from dinitro-chrysazine disulphonic acid from a mixture containing them.

Other objects of the invention will in part be obvious and will in part appear hereinafter.

The invention accordingly comprises the several steps and the relation of one or more of such steps with respect to each of the others thereof which will be exemplified in the process hereinafter disclosed. The scope of the invention will be indicated in the claims.

According to the present invention, a polyhydroxyanthraquinone compound which contains at least one hydroxyl group in each of the benzene residues of the anthraquinone nucleus, and, more particularly, one in which at least two of said hydroxyl groups are alpha-substituents, is sulphonated by heating it with oleum under reaction conditions which effect improved results, and the resulting sulphonic acid is nitrated without separation from the sulphonation mixture in which it was produced.

I have found that anthrarufine and/or chrysazine can be disulphonated with oleum at lower temperatures than have heretofore been employed, and, when such low temperatures are employed, that the reaction can be more readily controlled and oversulphonation is mitigated.

I have found, moreover, in the production of a dinitro-polyhydroxyanthraquinone disulphonic acid by the sulphonation with oleum of a polyhydroxyanthraquinone compound which contains at least one hydroxyl group in each of the benzene residues of the anthraquinone nucleus, and more particularly one in which at least two of said hydroxyl groups are alpha-substituents, followed by nitration of the resulting sulphonation mixture, that, in general, the presence in the reaction mixture of a sulphate of an alkali-forming metal (which expression is intended to include the sulphates of magnesium and ammonium as well as those of the alkali-metals and alkaline earth metals), and especially a sulphate of an alkali-metal, enables the sulphonation reaction to be more readily controlled; permits any of the three major reaction-controlling factors of the sulphonation—time, temperature and concentration of oleum—to be decreased without concurrently increasing one or both of the other of said factors; decreases over-sulphonation, decomposition and oxidation; and increases the yield and improves the quality of the products obtained.

I have furthermore found, that improved results are obtained in the sulphonation with oleum of dihydroxyanthraquinone, such as, anthrarufine and/or chrysazine, if, during the sulphonation, a sulphonic acid of said hydroxyanthraquinone, such as, an anthrarufine sulphonic acid and/or a chrysazine sulphonic acid, is caused to separate in the form of a salt from solution in the sulphonating medium. The dihydroxyanthraquinone sulphonic acid may be caused to separate in the form of a salt by having present in the reaction mixture, during the sulphonation, a sulphate of an alkali-forming metal, more particularly, a sulphate which is soluble in the reaction mixture, and especially, a sulphate of an alkali-metal, preferably, in an amount at least sufficient to form the mono-alkali-metal salt of the sulphonic acid produced. If necessary, or desirable, the reaction mixture may be seeded with crystals of the salt to be separated.

I have also found, if a suspension in sulphuric acid of a salt of a sulphonic acid of a polyhydroxyanthraquinone compound which contains at least one hydroxyl group in each of the benzene residues of the anthraquinone nucleus, such as the sulphonation mixture resulting from the sulphonation with oleum of anthrarufine and/or chrysazine and precipitation during the sulphonation of an anthrarufine sulphonic acid and/or a chrysazine sulphonic acid in the form of a salt, is subjected to nitration, that the corresponding nitro-sulphonic acid of the dihydroxyanthraquinone compound is obtained in the form of a salt which is difficultly soluble in the nitration reaction mixture, and may be readily filtered off. Furthermore, the nitration of an alkali-metal salt of anthrarufine disulphonic acid in a reaction mixture resulting from the sulphonation of anthrarufine with oleum to which an alkali-metal sulphate has been added may be carried out at lower temperatures than heretofore have been employed, whereby oxidation and decomposition are prevented and the reaction is more readily controlled.

In addition, I have found that dinitro-anthrarufine disulphonic acid can be separated from dinitrochrysazine disulphonic acid by treating a mixture containing them in the form of their free acids, or salts, to produce a suspension of an alkali-metal salt of the dinitro-anthrarufine disulphonic acid in a dilute sulphuric acid solution of the dinitro-chrysazine disulphonic acid, and separating the anthrarufine salt from the solution. Accordingly, when dinitro-anthrarufine disulphonic acid is obtained as a mixture with dinitro-chrysazine disulphonic acid in the form of their alkali-metal salts, the alkali-metal salt of dinitro-anthrarufine disulphonic acid may be isolated from the mixture, relatively free from dinitro-chrysazine disulphonic acid or its salts, by diluting a suspension of said mixture in concentrated sulphuric acid to form a suspension of the alkali-metal salt of dinitro-anthrarufine disulphonic acid in the resulting dilute sulphuric acid, and filtering off the alkali-metal salt of dinitro-anthrarufine disulphonic acid.

In carrying out the present invention in accordance with a preferred procedure, a polyhydroxyanthraquinone compound which contains at least one hydroxyl group in each of the benzene residues of the anthraquinone nucleus may be sulphonated by heating it with oleum which preferably contains a sulphate of an alkali-forming metal partially or wholly in solution in it. The sulphonation preferably may be continued until a disulphonic acid of the hydroxyanthraquinone compound is produced. After a short time, the hydroxyanthraquinone sulphonic acid formed usually begins to separate out of the sulphonation mixture in the form of a salt of the alkali-forming metal, particularly in those cases wherein a sufficient amount of the sulphate of the alkali-forming metal is present; if necessary, however, and especially when it is desired to cause the separation to take place at an earlier stage in the sulphonation than it would otherwise, the reaction mixture may be seeded with crystals of the sulphonic acid to be produced, or a salt thereof, in order to induce crystallization. When the sulphonation is complete, the resulting dihydroxyanthraquinone sulphonic acid, which is in the form of a salt of an alkali-forming metal, may be nitrated to produce the corresponding dihydroxyanthraquinone nitro-sulphonic acid, which may be obtained in the form of a readily filterable salt of an alkali-forming metal. If desired, the salt of the dihydroxyanthraquinone sulphonic acid may be isolated in any suitable manner from the sulphonation mixture before nitration, as for example, by filtering it off from a concentrated sulphuric acid solution of the remaining reaction mixture; it is preferably further treated, however, without isolating it from the sulphonation mixture in which it was produced.

The hydroxyanthraquinone compounds which may be employed in accordance with the invention are those which contain at least one hydroxyl group in each of the benzene residues of the anthraquinone nucleus; and those are preferred in which at least two of the said hydroxyl groups are alpha-substituents. Mixtures of two or more of said hydroxyanthraquinones also may be employed. The following compounds may be particularly mentioned as illustrations: anthrarufine, chrysazine, anthraflavic acid, isoanthraflavic acid, 1,7-dihydroxyanthraquinone, and anthrachrysone.

The oleum employed may be of any suitable concentration and preferably may be employed in an amount at least sufficient to produce the disulphonic acid of the dihydroxyanthraquinone. An oleum of about 15 to 30 per cent. sulphur trioxide concentration is preferred in view of its commercial availability and convenience in handling.

The sulphates of the alkali-forming metals which may be employed comprise the sulphates of sodium, potassium, ammonium, calcium, barium, strontium, magnesium, etc.; and they may be employed singly or in admixtures of two or more. The sulphates which are readily soluble in the oleum employed are preferred, as the advantages resulting from the presence of a sulphate of an alkali-forming metal in the reaction mixture are generally more completely realized when the sulphate is in solution. The alkali-forming metal sulphate preferably may be employed in an amount somewhat in excess of that corresponding to the amount of normal sodium sulphate required to form the monosodium salt of the sulphonic acid produced; and it may be added to the oleum and partially or wholly dissolved therein, or it may be generated in the oleum by reaction thereof with a suitable alkali-forming metal compound. The following will serve as preferred illustrations of suitable sulphates and other compounds: the normal sulphates, acid sulphates, polysulphates, pyrosulphates, carbonates, chlorides, borates, phosphates, etc., of sodium, potassium and ammonium.

The hydroxyanthraquinone may be added to the oleum before, together with, or after the alkali-forming metal sulphate when the latter is used; it preferably may be added to a mixture of the alkali-forming metal sulphate and the oleum.

The temperature at which the sulphonation may be carried out may also vary; thus, the reaction mixture may be heated to a temperature between about 70° and 120° C. The lower temperatures (e. g. below 100° C.) are preferred because they tend to produce less oversulphonation, decomposition and oxidation.

The heating preferably may be continued until the desired sulphonation has been effected. This is generally determined by testing portions of the reaction mixture until it shows substantial freedom from the original hydroxyanthraquinone compound treated.

The specific temperature employed and the duration of the heating for optimum results will depend to a considerable extent upon the other factors controlling the reaction; such as, the particular hydroxyanthraquinone treated, the amount and strength of oleum used, whether or not a sulphate of an alkali-forming metal is present, and if so, the particular alkali-forming metal sulphate employed, etc. It is to be noted, however, that the presence in the sulphonation reaction mixture of a sulphate of an alkali-forming metal, and especially of an alkali-metal sulphate, generally increases the speed of the reaction, particularly at the higher temperatures; so that a weaker oleum, or a lower temperature or a shorter reaction period may be employed in carrying out the reaction than heretofore was known to be possible under similar reaction conditions. To illustrate, I have found that technical anthrarufine can be disulphonated by heating it at 110° to 115° C. for about 20 minutes with 5.25 parts of 16.7 per cent. oleum (per part by weight of anthrarufine) in which .33 parts of anhydrous sodium sulphate has been dissolved; whereas, the same ingredients, with the exception of the sodium sulphate, in the same proportions and heated at the same temperature requires 30 minutes to complete the reaction. In addition, the reaction mixture which contains the sodium sulphate produces the higher yield of anthrarufine disulphonic acid, and in the purer form. The reaction also may be carried out with a correspondingly smaller proportion of stronger oleum (e. g., 4 parts of 22 per cent. oleum per part of anthrarufine) and at a lower temperature (e. g., 80° to 85° C.), in which case the presence of .33 parts of anhydrous sodium sulphate (per part of anthrarufine) reduces the reaction time from about 3 hours to about 1.75 hours.

The nitration of the dihydroxyanthraquinone sulphonic acid may be effected by treating the dihydroxyanthraquinone sulphonic acid in the form of a suspension of its salt in oleum or sulfuric acid with a nitrating agent. It preferably may be brought about by agitating with a nitrating agent the reaction mixture resulting from the sulphonation of a dihydroxyanthraquinone with oleum containing a sulphate of an alkali-forming metal. Any suitable nitrating agent may be employed, such as, mixed acid (a mixture of nitric and sulphuric acids); a preferred nitrating agent is a mixed acid which contains a relatively high proportion of nitric acid. The nitration may be carried out at any usual or suitable temperature. I prefer, however, to employ temperatures lower than have been used in such nitrations, so far as I am aware, in order to increase the purity of the resulting product. Thus, in the nitration of anthrarufine disulphonic acid with mixed acid, I have found that oxidation and decomposition are mitigated, resulting in a lessened production of by-products and impurities, when the nitration is carried out at a final temperature not exceeding about 35° C., instead of the temperature of 60° C. heretofore employed. Additional sulphuric acid may be added to the sulphonation reaction mixture before nitration, as a diluent, when the mixture is too thick to be readily agitable.

The dihydroxyanthraquinone nitro-sulphonic acid, which is generally obtained in the form of a suspension of its salt in the nitration reaction mixture, may be separated and recovered in any suitable manner. For example, the nitration reaction mixture may be filtered, the filter cake, containing the nitro-sulphonic acid salt, may be introduced into water, and the nitro-sulphonic acid salt may be separated by salting (e. g., with common salt), or by crystallization; or the nitration reaction mixture may be drowned in water, and the nitro-sulphonic acid may be recovered by salting (e. g., with common salt); or the nitration reaction mixture may be drowned in an aqueous solution of a suitable alkali-metal salt, (e. g., sodium or potassium chloride or sulphate, etc.).

As illustrative embodiments of a manner in which the invention may be practiced the following examples are presented. The parts are by weight.

*Example 1.*—20 parts of anhydrous sodium sulphate is added to a mixture of about 200 parts of 26 per cent. oleum and about 37 parts of 100 per cent. sulphuric acid (equivalent to about 237 parts of 22 per cent. oleum) contained in a suitable vessel equipped with an agitator and heating and cooling means, and the mixture is stirred until the sodium sulphate is substantially completely dissolved. The mixture is cooled to about 30° C., to prevent undue temperature rise during the subsequent addition of anthrarufine, and about 60 parts of technical anthrarufine (containing about 58.9 parts of a mixture of anthrarufine and chrysazine) is added with stirring. The reaction mixture is agitated until substantially all of the anthrarufine has dissolved, is then heated to about 80° C., and is maintained at a temperature of about 80° to 85° C. for a few minutes; then crystals of the sodium salt of anthrarufine disulphonic acid are added as a seed, and heating is continued at 80° to 85° C. until the sulphonation is complete, as indicated by complete solution of a sample in water. During the sulphonation, the disulphonic acids produced crystallize out of solution. The resulting mixture which comprises the sodium salts of the disulphonic acids of anthrarufine and chrysazine, sodium sulphate and sulphuric acid, is cooled, about 47 parts of 100 per cent. sulphuric acid is added to render the mass more fluid and agitable, and then about 180 parts of a mixture of nitric and sulphuric acids (containing about 20 parts of nitric acid and about 75 parts of sulphuric acid per hundred parts of mixture) is slowly added with good agitation while maintaining the temperature at about 25° C. to 30° C. After the nitrating acid has all been added, agitation is continued while maintaining the temperature below 35° C., until a test portion, after having been neutralized with sodium hydroxide, exhibits a pure blue color upon the addition of sodium stannite. The reaction mixture is then drowned in about 2900 parts of cold water, and sufficient salt is added to complete the precipitation of the product, which has already partially crystallized (about 560 parts ordinarily being used). The mass is allowed to stand with occasional agitation until precipitation is complete, the precipitate is filtered off, and the filter cake is washed with salt water, and recovered in the paste form or dried. The resulting product is technical dinitro-anthrarufine disulphonic acid in the form of a sodium salt, and comprising a mixture of a major proportion of a sodium salt of dinitro-anthrarufine disulphonic acid with a minor proportion of a sodium salt of dinitrochrysazine-disulphonic acid. It may be reduced, without further purification, for the production of a dyestuff dyeing wool from an acid bath in bright blue shades.

*Example 2.*—The process described in Example 1 is carried out as far as the completion of the nitration. Upon completion of the nitration, the mixture is cooled to about 20° C., and drowned in about 2650 parts of water cooled to a temperature of about 3° to 5° C. The first portions of the mixture seem to dissolve in the water, then a precipitate appears which increases as the remainder of the mixture is added; the temperature rises to about 20° C. The mixture is allowed to stand with occasional agitation to permit it to reach a condition of equilibrium, it is then filtered and the filter-cake is washed with a small amount of cold water. The washings may be added to the filtrate or may be employed as a part of the diluting water in a subsequent repetition of the process. The resulting product may be dried or left in the paste form. It comprises the sodium salt of dinitro-anthrarufine disulphonic acid, and is relatively free from dinitro-chrysazine disulphonic acid and its sodium salt; judging from its action when reduced, then dissolved in sulphuric acid, and treated with boric acid. The filtrate contains dinitro-chrysazine disulphonic acid mixed with residual dinitro-anthrarufine disulphonic acid; they may be recovered therefrom by salting out with common salt, filtering off the resulting precipitate, and washing with salt water.

It will be realized that the invention is not limited to the specific examples given above, and that the process may be varied within wide limits without departing from the spirit and scope of the claims.

Thus, other polyhydroxyanthraquinone compounds which contain at least one hydroxyl group in each of the benzene residues of the anthraquinone nucleus may be employed in the above example instead of, or in admixture with, the anthrarufine.

The amount and strength of oleum may be varied over wide limits; an amount of an oleum of about 18 to 22 per cent. strength corresponding with about 2.6 mols of sulfur trioxide per mol of dihydroxyanthraquinone is preferred. A correspondingly larger amount of weaker oleum requires a higher temperature or longer reaction period to produce the same result, and a correspondingly lesser amount of stronger oleum increases the danger of local oversulphonation and unduly thickens the mass. If the dihydroxyanthraquinone contains an undue amount of moisture or of impurities, additional oleum may be added, as required, to complete the sulphonation.

The sulphonation process may be carried out with or without a sulphate of an alkali-forming metal, and with or without separation out of the sulphonation mixture of the resulting sulphonic acid as a salt. The inclusion in the reaction mixture of a sulphate of an alkali-forming metal, and, particularly of an alkali-metal sulphate, is preferred, however, as it renders the reaction easier to control, reduces oxidation, increases the purity of the resulting product, increases the yield, and reduces the danger of oversulphonation; in fact, the presence of an alkali-forming metal sulphate, and particularly of an alkali-metal sulphate, permits the reaction mixture, especially at the lower temperatures, to be heated for a longer time than is necessary for completion of the desired sulphonation without producing substantial oversulphonation. Seeding also is preferred as it hastens the separation of the sulphonation product from the reaction mixture. The amount of metal sulphate employed may be varied; a preferred minimum amount is that equivalent to about .5 to .6 mols of normal sodium sulphate per mol of dihydroxyanthraquinone. A lesser amount tends to decrease the benefits resulting from its presence, and a greater amount is of no particular advantage. When the metal sulphate is generated in the reaction mixture by reaction with the oleum, proper allowance for the sulphuric acid removed thereby should preferably be made.

The sulphonation may be carried out at temperatures above 70° C., particularly between about 80° and 115° C. Temperatures of about 80° to 85° C. are preferred; owing to the requirement of careful control of the reaction at the higher temperatures in view of the increased speed of the reaction in the presence of the metal sulphate, and particularly an alkali-metal sulphate, and owing to the excessive reaction time required at the lower temperatures.

The sulphonic acid may be nitrated in the form of its free acid or salt; but nitration of the sulphonic acid salt, particularly the alkali-metal salt, and especially the salt resulting from the sulphonation of the dihydroxyanthraquinone with oleum containing an alkali-metal sulphate, is preferred as it increases the yield and purity of the nitro-sulphonic acid obtained. The nitration may be carried out with mixed acid, which may vary in the relative concentration of nitric acid; or with a nitrate, such as an alkali-metal nitrate, and sulphuric acid; or with any other suitable nitrating agent. The nitration also may be carried out at other temperatures, e. g., about 60° C.; but a temperature not exceeding about 35° C. is preferred for the nitration of anthrarufine, because of the greater purity of the resulting product compared to that of the product obtained at the higher temperatures.

The nitration reaction mixture resulting from the nitration of technical anthrarufine disulphonic acid, containing dinitro-anthrarufine disulphonic acid and dinitro-chrysazine disulphonic acid, may also be treated in other ways to recover said products; as for example, the reaction mixture may be drowned in an aqueous solution of a suitable alkali-metal salt, such as sodium chloride, potassium chloride, sodium sulphate, etc., and the dinitro-anthrarufine disulphonic acid may be recovered in admixture with the dinitro-chrysazine disulphonic acid, by filtering off the precipitate and washing it with an aqueous salt solution; or the nitration reaction mixture may be filtered, the filter cake, containing a mixture of the alkali-metal salt of dinitro-anthrarufine disulphonic acid and dinitro-chrysazine disulphonic acid may be added to water, and the alkali-metal salt of dinitro-anthrarufine disulphonic acid, which forms a suspension in the resulting solution may be filtered off and recovered relatively free from the dinitro-chrysazine disulphonic acid compound; or, the suspension obtained after addition of the filter-cake to water may be treated with a suitable alkali-metal salt, for example, sodium chloride, to salt out a mixture of the alkali-metal salts of dinitro-anthrarufine disulphonic acid and dinitro-chrysazine disulphonic acid, which then may be filtered off and washed.

The invention, furthermore, is not limited to the preparation of dinitro-anthrarufine disulphonic acid relatively free from dinitro-chrysazine disulphonic acid by the dilution with water of a suspension in sulphuric acid of a mixture produced by nitrating a suspension of a mixture of the alkali-metal salts of anthrarufine disulphonic acid and chrysazine disulphonic acid in sulphuric acid or oleum (as illustrated in the above example), but includes its preparation from a mixture of dinitro-anthrarufine disulphonic acid and dinitro-chrysazine disulphonic acid obtained in any manner. Thus, a mixture of dinitro-anthrarufine disulphonic acid and dinitro-chrysazine disulphonic acid, prepared in any suitable manner, may be dissolved or suspended in concentrated sulphuric acid (e. g., 93 per cent.), the solution may be treated with a sufficient amount of a suitable alkali-metal salt (e. g., sodium or potassium sulphate, sodium or potassium chloride, etc.) to produce the alkali-metal salts of said dinitro-disulphonic acids, the resulting mixture may be drowned in water, dilute sulphuric acid, or washings from a previous repetition of the process (whereby a suspension is obtained of the alkali-metal salt of the dinitro-anthrarufine disulphonic acid in a dilute sulphuric acid solution containing the dinitro-chrysazine-disulphonic acid and some residual dinitro-anthrarufine disulphonic acid), and the alkali-metal salt of dinitro-anthrarufine disulphonic acid may be filtered off and washed, for example, with water. The extent to which the sulphuric acid mixture is diluted will depend upon several factors, such as the amount of liquid to be handled, the corrosive effect of the acid solution on the filtering equipment employed, etc. Dilution to a concentration of about a 10 to 20 per cent. aqueous sulphuric acid solution is ordinarily preferred for operation in standard factory equipment. The temperature at which the dilution is performed may vary. A temperature of about 15° to 20° C. for the precipitation is preferred, as the lower the temperature, the greater is the proportion of the anthrarufine derivative obtained. The diluting liquid is preferably pre-cooled to compensate for the temperature rise caused by the heat evolved in the hydration of the sulphuric acid.

Since, in carrying out the above process, changes may be made without departing from the scope of the invention, it is intended that all matter contained in the above description shall be interpreted as illustrative and not in a limiting sense, except as limited by the claims.

This application contains subject matter which is broadly claimed in my application Serial No. 437,590, filed of even date for Process of sulfonating anthraquinone and its derivatives.

I claim:

1. A process for the production of derivatives of polyhydroxyanthraquinones which comprises sulphonating a polyhydroxyanthraquinone compound which contains at least one hydroxyl group in each of the benzene residues of the anthraquinone nucleus by heating it with a reaction mixture containing oleum and a sulphate of an alkali-forming metal, and nitrating the resulting reaction mixture.

2. A process for the production of derivatives of polyhydroxyanthraquinones which comprises sulphonating a polyhydroxyanthraquinone compound which contains at least one hydroxyl group in each of the benzene residues of the anthraquinone nucleus by heating it with a reaction mixture containing oleum and a sulphate of an alkali metal, and nitrating the resulting reaction mixture.

3. A process for the production of derivatives of polyhydroxyanthraquinones which comprises sulphonating a polyhydroxyanthraquinone compound which contains at least one hydroxyl group in each of the benzene residues of the anthraquinone nucleus by heating it with a reaction mixture containing oleum and a sulphate of an alkali-forming metal, causing the resulting polyhydroxanthraquinone sulphonic acid to separate out of solution in the reaction medium during the sulphonation, and subjecting the resulting mixture to the action of nitrating agent.

4. A process for the production of derivatives of alpha-alpha-dihydroxanthraquinones, which comprises sulphonating an alpha-alpha-dihydroxyanthraquinone by heating it with a mixture containing oleum and a sulphate of an alkali metal, seeding the reaction mixture, during the sulphonation, with crystals of an alkali-metal salt of the dihydroxyanthraquinone sulphonic acid to be produced, to cause the dihydroxyanthraquinone sulphonic acid to separate out of solution in the reaction medium, and subjecting the resulting mixture to the action of a nitrating agent.

5. A process for the production of dinitroanthrarufine disulphonic acid which comprises sulphonating anthrarufine by heating it at a temperature between about 70° and 120° C. with a reaction mixture containing oleum and a sulphate of an alkali-metal, and nitrating the resulting alkali-metal salt of anthrarufine disulphonic acid by reacting the sulphonation reaction mixture with a nitrating acid.

6. A process for the production of dinitroanthrarufine disulphonic acid which comprises sulphonating anthrarufine by heating it at a temperature between about 80° and 100° C. with a mixture of oleum and sodium sulphate, and nitrating the resulting sodium salt of anthrarufine disulphonic acid by reacting the sulphonation reaction mixture with a nitrating acid at a temperature not exceeding 35° C.

7. A process for the production of dinitroanthrarufine disulphonic acid which comprises sulphonating a mixture containing anthrarufine and chrysazine by heating it with a reaction mixture containing oleum and a sulphate of an alkali metal, subjecting the resulting reaction mixture to the action of a nitrating acid, diluting the resulting nitration reaction mixture to form a suspension of an alkali-metal salt of dinitroanthrarufine disulphonic acid in a dilute sulphuric acid solution of dinitro-chrysazine disulphonic acid, and separating the alkali-metal salt of dinitro-anthrarufine disulphonic acid from the remaining solution.

8. A process for the production of dinitroanthrarufine disulphonic acid which comprises dissolving a sodium sulphate in oleum, adding technical anthrarufine, containing anthrarufine and chrysazine, to said oleum, heating the resulting mixture with agitation at a temperature of about 80° to 85° C. until sulphonation is substantially complete, agitating the resulting mixture with a nitrating acid at a temperature below 35° C., and recovering the dinitro-anthrarufine disulphonic acid produced.

9. A process for the production of dinitroanthrarufine disulphonic acid which comprises dissolving sodium sulphate in oleum, adding technical anthrarufine, containing anthrarufine and chrysazine, to said oleum, in the proportion of 1 mol of technical anthrarufine to about 2.6 mols of sulphur trioxide and about 0.5 mol of anhydrous sodium sulphate, heating the resulting mixture with agitation at a temperature of about 80° to 85° C. for a few minutes, adding crystals containing the sodium salt of anthrarufine disulphonic acid as a seed to cause the reaction mass to crystallize, continuing the heating at said temperature until a sample is substantially completely soluble in water, adding sulphuric acid to the resulting mixture as a diluent, agitating the mixture with a nitrating mixture of nitric and sulphuric acids while maintaining the temperature below 35° C. until the nitration is substantially complete, introducing the resulting reaction mixture into sufficient water to form a sulphuric acid solution of about 10 to 20 per cent. concentration, and filtering the resulting suspension to recover the sodium salt of dinitro-anthrarufine disulphonic acid.

10. A process for the production of derivatives of polyhydroxyanthraquinones which comprises sulphonating a polyhydroxyanthraquinone compound which contains at least one hydroxyl group in each of the benzene residues of the anthraquinone nucleus by heating it with a reaction mixture containing oleum and a sulphate of an alkali-forming metal.

11. A process for the production of derivatives of alpha-alpha-dihydroxyanthraquinones which comprises sulphonating an alpha-alpha-dihydroxyanthraquinone by heating it with oleum and an alkali-metal sulphate.

12. A process for the production of derivatives of polyhydroxyanthraquinones which comprises sulphonating a polyhydroxyanthraquinone compound which contains at least one hydroxyl group in each of the benzene residues of the anthraquinone nucleus by heating it with oleum at a temperature between about 70° and 100° C.

13. A process for the production of derivatives of alpha-alpha-dihydroxyanthraquinones which comprises sulphonating an alpha-alpha-dihydroxyanthraquinone by heating it with oleum at a temperature of about 80° to 85° C.

14. A process for the production of derivatives of alpha-alpha-dihydroxyanthraquinones which comprises sulphonating an alpha-alpha-dihydroxyanthraquinone by heating it with a solution of sodium sulphate in oleum at a temperature of about 80° to 85° C.

15. A process for the production of derivatives of polyhydroxyanthraquinones which comprises sulphonating a polyhydroxyanthraquinone compound which contains at least one hydroxyl group in each of the benzene residues of the anthraquinone nucleus by heating it with a reaction mixture containing oleum and a sulphate of an alkali-forming metal and, during the sulphonation, causing the sulphonic acid produced to separate out of solution in the reaction mixture.

16. A process for the production of anthraquinone derivatives which comprises sulphonating an alpha-alpha-dihydroxyanthraquinone by heating it with a reaction mixture containing oleum and a sulphate of an alkali-forming metal, and, during the sulphonation, causing the sulphonic acid produced to separate out of solution in the reaction mixture.

17. In the production of anthraquinone derivatives by a process which comprises sulphonating an alpha-alpha-dihydroxyanthraquinone with oleum, the improvement which comprises causing the sulphonic acid produced to separate in the form of an alkali-metal salt while continuing the sulphonation.

18. A process for the production of anthraquinone derivatives which comprises sulphonating an alpha-alpha-dihydroxyanthraquinone by heating it with a reaction mixture containing oleum and a sulphate of an alkali-metal, and, during the sulphonation, causing the sulphonic acid produced to separate in the form of an alkali-metal salt by adding crystals comprising an alkali-metal salt of said sulphonic acid as a seed.

19. In the production of anthraquinone derivatives by a process which comprises sulphonating anthrarufine with oleum, the improvement which comprises seeding the reaction mixture to cause anthrarufine disulphonic acid to separate out of solution in the reaction mixture while continuing the sulphonation.

20. A process for the production of anthraquinone derivatives which comprises nitrating anthrarufine disulphonic acid by treating it with a nitrating acid at a temperature not exceeding 35° C.

21. A process for the production of anthraquinone derivatives which comprises nitrating an alpha-alpha-dihydroxyanthraquinone sulphonic acid by treating it in the form of an alkali-metal salt with a nitrating agent.

22. A process for the production of anthraquinone derivatives which comprises nitrating an alpha-alpha-dihydroxyanthraquinone sulphonic acid by reacting it in the form of a sodium salt and in admixture with sulphuric acid with a nitrating acid.

23. A process for the recovery of dinitro-anthrarufine disulphonic acid which comprises treating a mixture of dinitro-anthrarufine disulphonic acid and dinitro-chrysazine-disulphonic acid to produce a suspension of an alkali-metal salt of dinitro-anthrarufine disulphonic acid in a sulphuric acid solution of dinitro-chrysazine disulphonic acid, and separating the undissolved salt of dinitro-anthrarufine disulphonic acid from the solution.

24. A process for the recovery of dinitroanthrarufine disulphonic acid which comprises forming a mixture of alkali-metal salts of dinitro-anthrarufine disulphonic acid and dinitro-chrysazine disulphonic acid with concentrated sulphuric acid, diluting said mixture to form a suspension of the alkali-metal salt of dinitro-anthrarufine disulphonic acid in a dilute sulphuric acid solution, and separating the alkali-metal salt of dinitro-anthrarufine disulphonic acid from the solution.

25. A process for the recovery of dinitro-anthrarufine disulphonic acid which comprises nitrating a mixture of the sodium salts of anthrarufine disulphonic acid and chrysazine disulphonic acid with a nitrating mixture of nitric and sulphuric acids, diluting the reaction mixture with water to form a suspension of the sodium salt of dinitro-anthrarufine disulphonic acid in a dilute sulphuric acid solution, and filtering off said sodium salt of dinitro-anthrarufine disulphonic acid.

26. In the production of derivatives of polyhydroxyanthraquinones by a process which comprises sulphonating a polyhydroxyanthraquinone compound which contains at least one hydroxyl group in each of the benzene residues of the anthraquinone nucleus and nitrating the resulting sulphonic acid, the improvement which comprises carrying out the sulphonation in the presence of a sulphate of an alkali-forming metal, and nitrating the resulting reaction mixture.

27. In the production of derivatives of polyhydroxyanthraquinones by a process which comprises sulphonating a polyhydroxyanthraquinone compound which contains at least one hydroxyl group in each of the benzene residues of the anthraquinone nucleus, the improvement which comprises carrying out the sulphonation in the presence of a sulphate of an alkali-forming metal.

28. In the production of derivatives of polyhydroxyanthraquinones by a process which comprises sulphonating a polyhydroxyanthraquinone compound which contains at least one hydroxyl group in each of the benzene residues of the anthraquinone nucleus, the improvement which comprises carrying out the sulphonation in the presence of a sulphate of an alkali metal.

DONALD G. ROGERS.

CERTIFICATE OF CORRECTION.

Patent No. 1,924,166.  August 29, 1933.

DONALD G. ROGERS.

It is hereby certified that error appears in the printed specification of the above numbered patent requiring correction as follows: Page 2, lines 90 and 91, for "dihydroxyanthraquinone" read "polyhydroxyanthraquinone"; and that the said Letters Patent should be read with this correction therein that the same may conform to the record of the case in the Patent Office.

Signed and sealed this 26th day of September, A. D. 1933.

F. M. Hopkins (Seal)  Acting Commissioner of Patents.